(12) United States Patent
Coons

(10) Patent No.: US 9,383,628 B1
(45) Date of Patent: *Jul. 5, 2016

(54) HUMIDITY PREVENTION SYSTEM WITHIN A CAMERA HOUSING

(71) Applicant: GoPro, Inc., San Mateo, CA (US)

(72) Inventor: Evan L. Coons, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/931,735

(22) Filed: Nov. 3, 2015

Related U.S. Application Data

(63) Continuation of application No. 14/792,157, filed on Jul. 6, 2015, now Pat. No. 9,213,218.

(51) Int. Cl.
*G03B 17/08* (2006.01)
(52) U.S. Cl.
CPC ..................... *G03B 17/08* (2013.01)
(58) Field of Classification Search
CPC ...................................... G03B 17/08
See application file for complete search history.

(56) References Cited

U.S. PATENT DOCUMENTS

| | | | | | |
|---|---|---|---|---|---|
| 5,243,467 | A | * | 9/1993 | Tanaka | G02B 7/102 359/694 |
| 6,138,826 | A | * | 10/2000 | Kanamori | A45C 11/38 206/316.2 |
| 6,640,053 | B1 | * | 10/2003 | Dirisio | G03B 17/08 348/81 |
| 9,213,218 | B1 | * | 12/2015 | Coons | G03B 17/08 |
| 2005/0117897 | A1 | * | 6/2005 | Funahashi | G03B 17/08 396/27 |
| 2008/0253756 | A1 | * | 10/2008 | Gourova | G03B 17/08 396/27 |
| 2010/0013984 | A1 | * | 1/2010 | Loiacono | G03B 17/08 348/373 |

* cited by examiner

*Primary Examiner* — W B Perkey
(74) *Attorney, Agent, or Firm* — Fenwick & West LLP

(57) ABSTRACT

A camera housing includes a humidity prevention system comprising various seals between internal components of the housing such as an external shell of the housing, a lens barrel within the external shell, a front cover of the housing, an outer front cover of the housing, and a viewing component connected to the outer front cover. A plurality of seals creates an airtight seal between the lens barrel and the front cover and between the front cover and the outer front cover. The seals create an airtight cavity within the outer front cover, the viewing component, the front cover, and the lens barrel. Additional seals can also be used to create an airtight seal between the outer front cover and the viewing component and between the external shell and the front cover, further preventing humidity from accumulating within the closed airtight space.

20 Claims, 11 Drawing Sheets

HUMIDITY PREVENTION SYSTEM WITHIN A CAMERA HOUSING

CROSS REFERENCE TO RELATED APPLICATIONS

This application is a continuation of U.S. application Ser. No. 14/792,157, filed Jul. 6, 2015, now U.S. Pat. No. 9,213, 218, which is incorporated by reference in its entirety.

BACKGROUND

1. Technical Field

This disclosure relates to a camera system, and more specifically, to a humidity prevention system for a camera housing.

2. Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user, as well as have accessible input/output (I/O) doors and openings on the cameras that, during use, would not compromise humidity prevention of the lenses of the cameras. Humidity within a lens component of a camera can diminish the quality of images captured by the camera, and can even damage the camera electronics.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
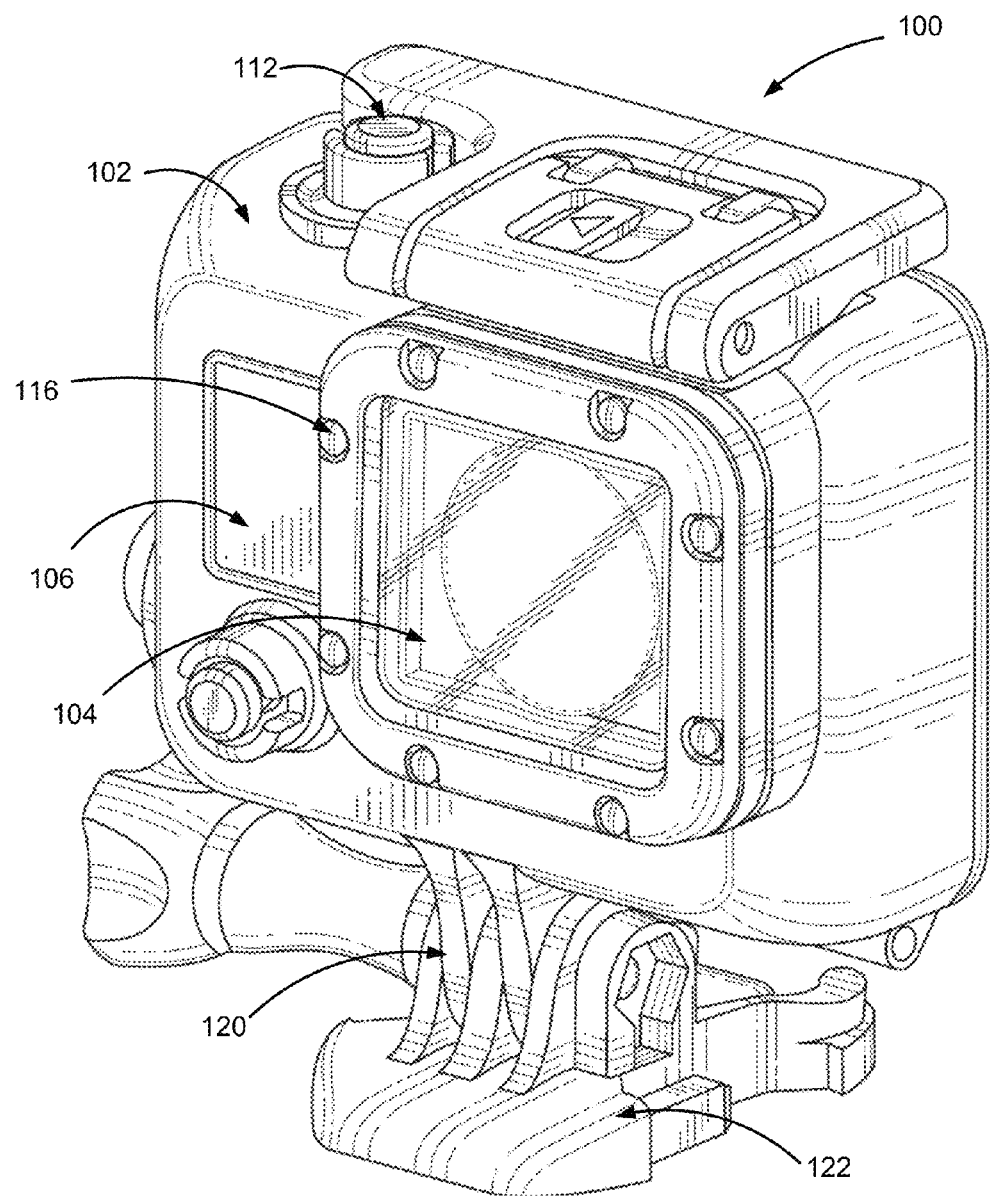
FIG. 1a illustrates a perspective view of a camera system, according to one embodiment.
Figure 1B:
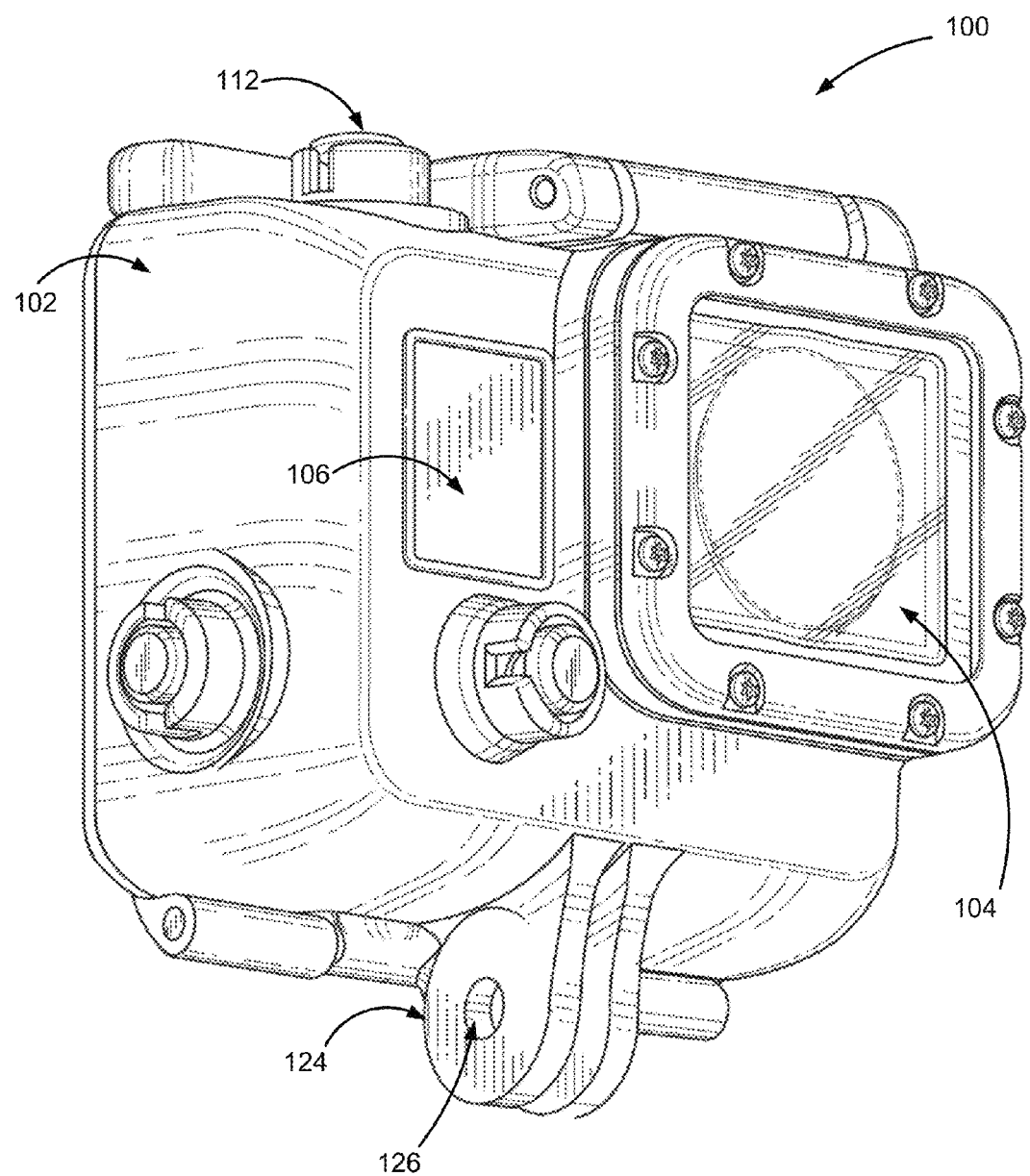
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
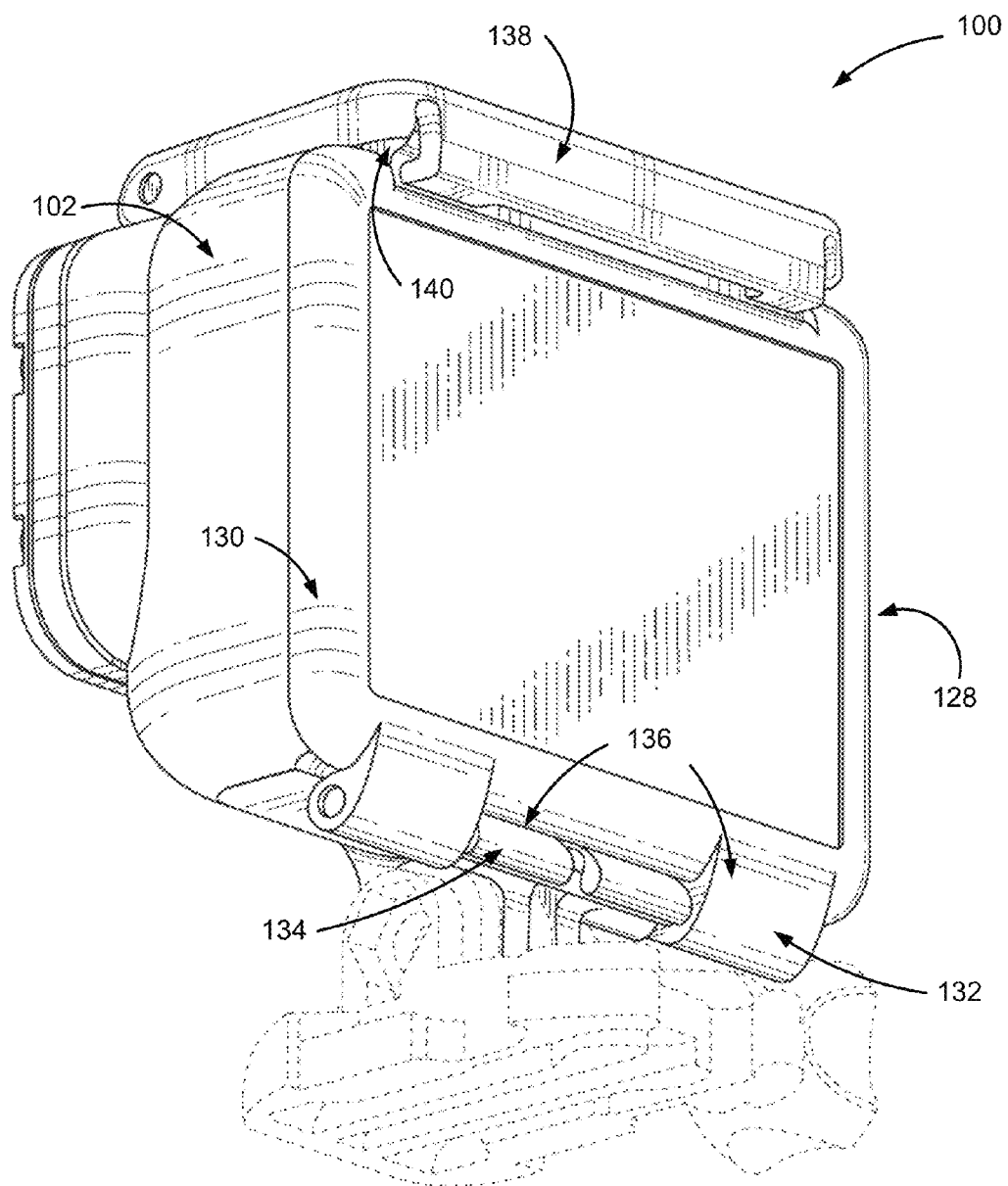
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 2. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
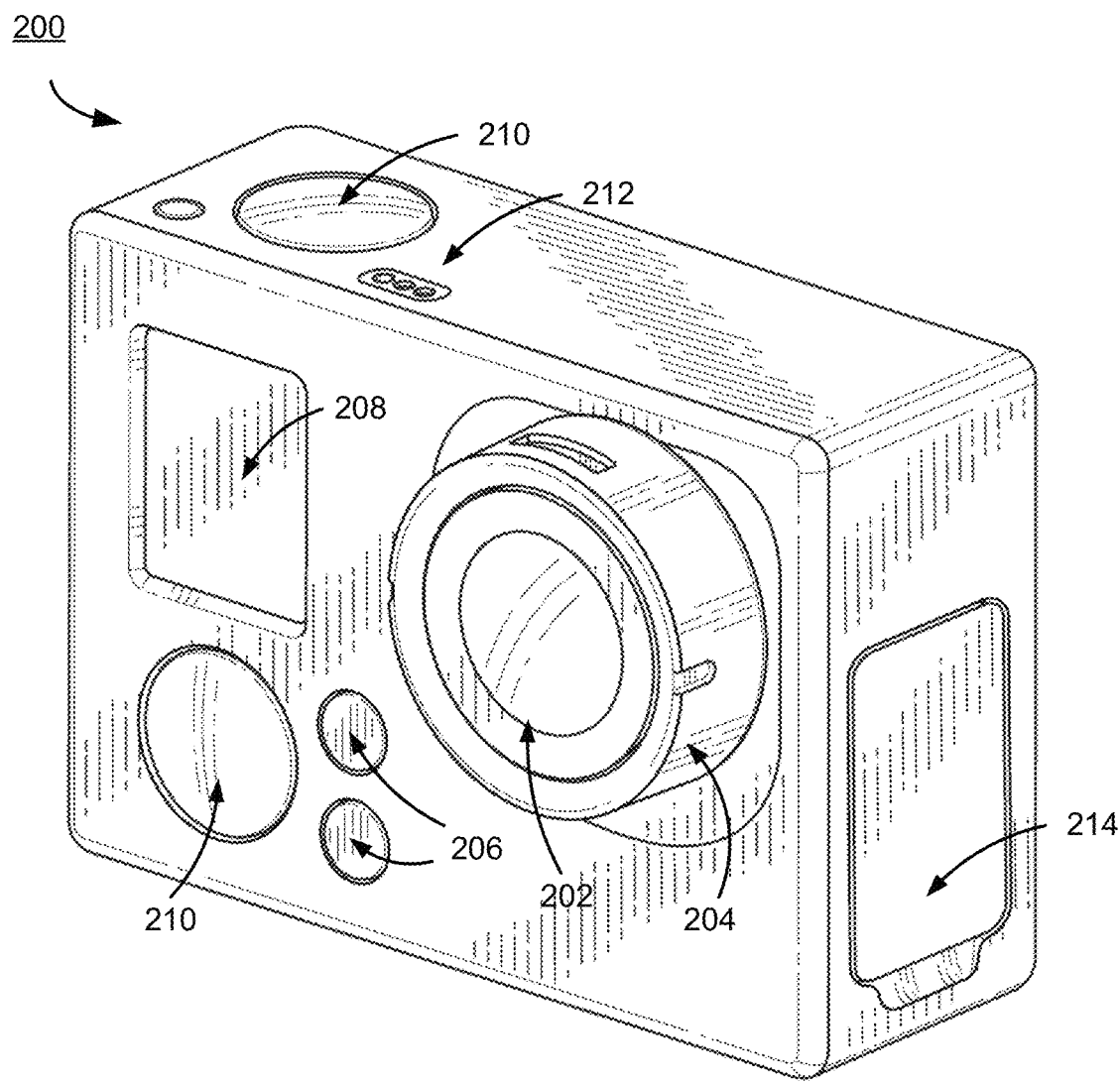
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
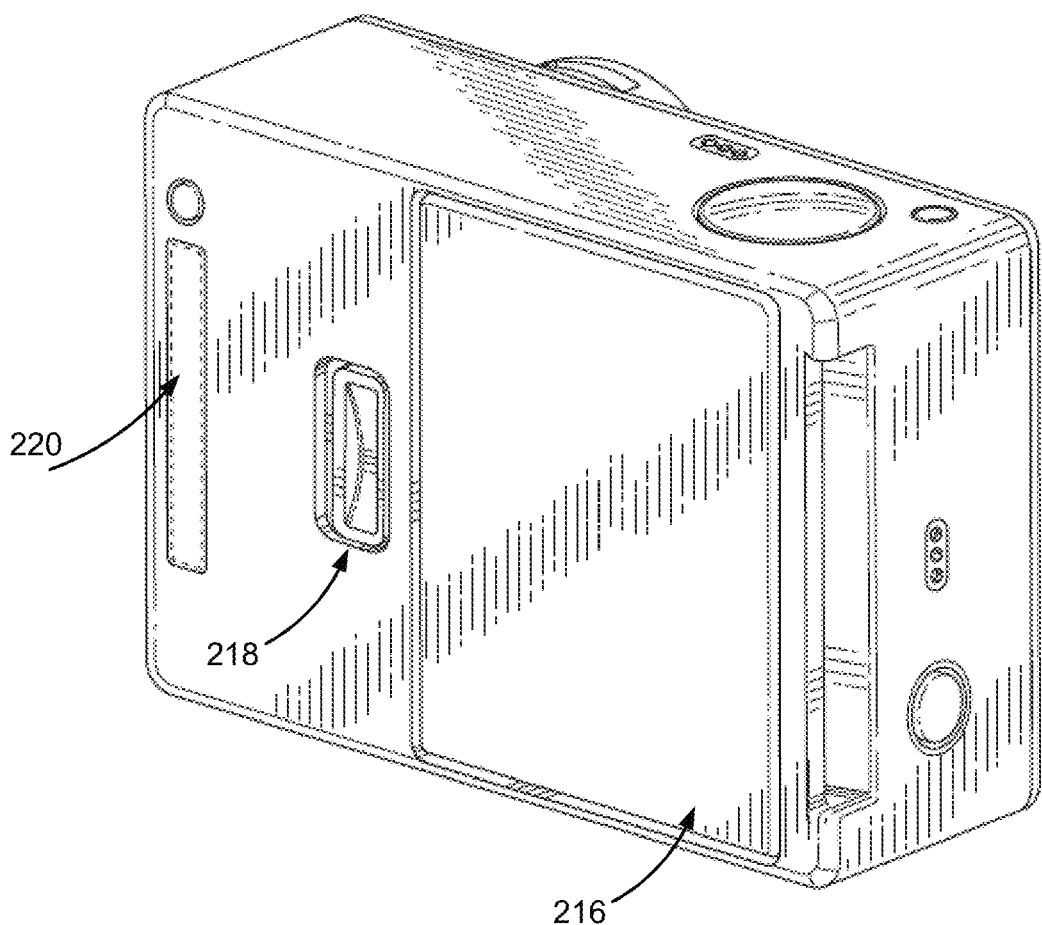
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Humidity Prevention System within a Camera

Figure 3A:
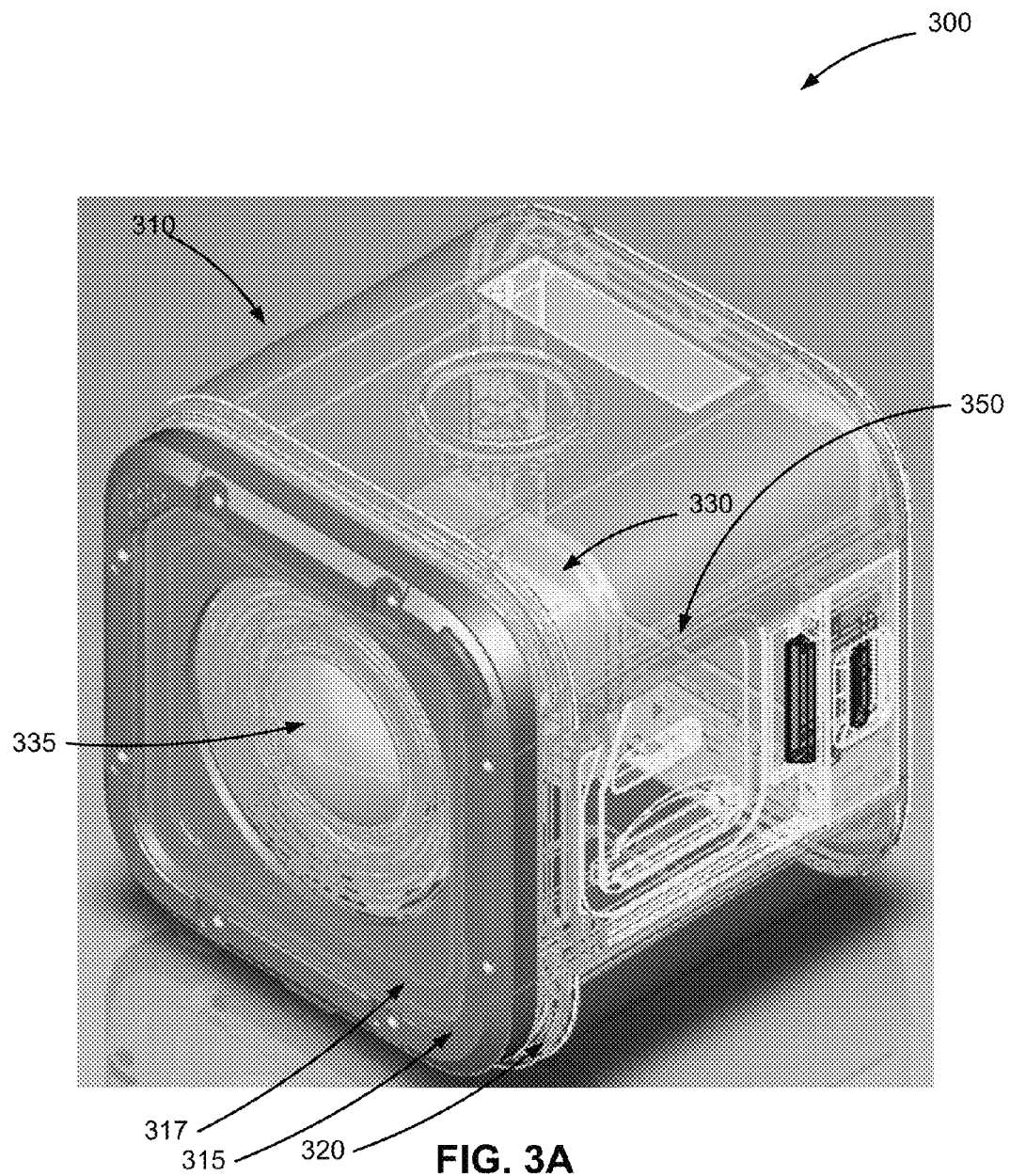
FIG. 3a illustrates a front perspective view of a camera housing including an outer front cover, according to one embodiment.
Figure 3B:
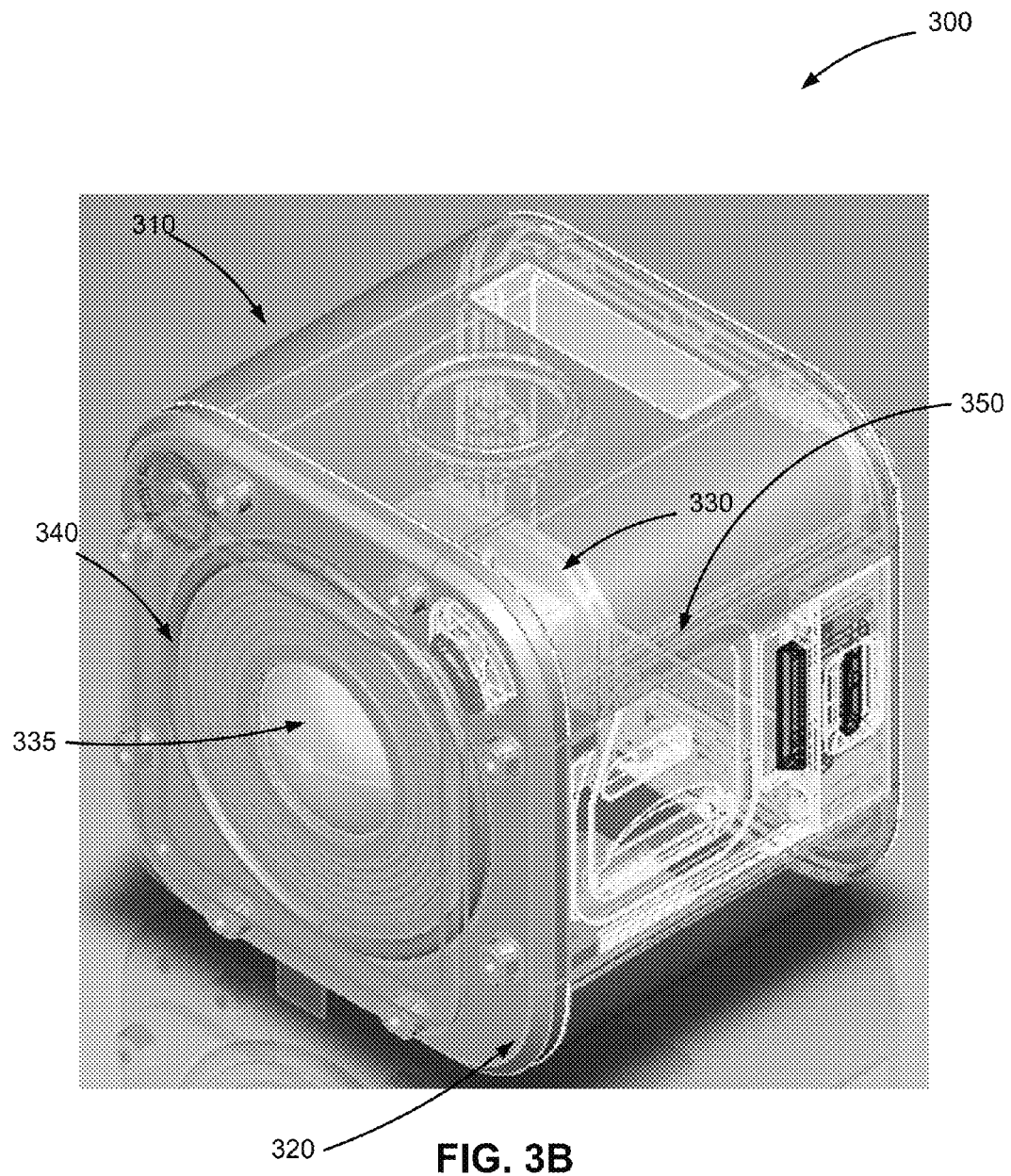
FIG. 3b illustrates a front perspective view of a camera housing with the outer front cover removed, according to one embodiment.

FIGS. 3a and 3b illustrate various perspective views of a camera housing 300, according to one embodiment. The camera housing 300 includes an external shell 310, an outer front cover 315, a viewing component 317, a front cover 320, a lens barrel 330, a first sealing component 340, and one or more openings 350. The front cover 320 includes an opening for a lens 335 such that the lens 335 can capture light that passes through the viewing component 317 and incident upon the lens 335 without being obstructed by the front cover 320. The camera housing 300 can include additional components but, to illustrate the humidity prevention system, the other additional components will not be discussed further.

Referring now to FIG. 3a, the lens barrel 330 detachably couples with the lens 335, which is enclosed between the outer front cover 315 that encloses the front cover 320 and lens 335 and the external shell 310. The lens barrel 330 is coupled to the front cover 320, for example, with a sealing mechanism such as a screw, adhesive, glue, or any other suitable material that holds the lens barrel 330 and the front cover 320 together. The outer front cover 315 is coupled to a viewing component 317, as described further below in conjunction with FIGS. 4a, 4b, and 4c. The space (shown in FIGS. 4b and 4c) created between the outer front cover 315, the viewing component 317, and the front cover 320 is airtight through various seals in the humidity prevention system, as described further in conjunction with FIGS. 4a, 4b, and 4c. The viewing component 317 is a lens cover and can be a glass pane, plastic pane, or any other suitable transparent component that can be used in front of a lens during image capture.

FIG. 3b illustrates the camera housing of FIG. 3a with the outer front cover 315 removed to better illustrate the first sealing component 340, the front cover 320, and the lens 335. The first sealing component 340 creates an airtight seal between the front cover 320, the outer front cover 315, and the lens 335. In the embodiment shown in FIG. 3b, the first sealing component 340 is an O-ring that surrounds the lens 335 but can be any other suitable mechanical seal that joins the front cover 320 with the outer front cover 315, preventing air (e.g., from within the external shell 310) from entering the space 430. The first sealing component 340 can be rubber, plastic, foam, glue, or any other suitable material configured to create an airtight seal between the outer front cover 315 and front cover 320.

Figure 3C:
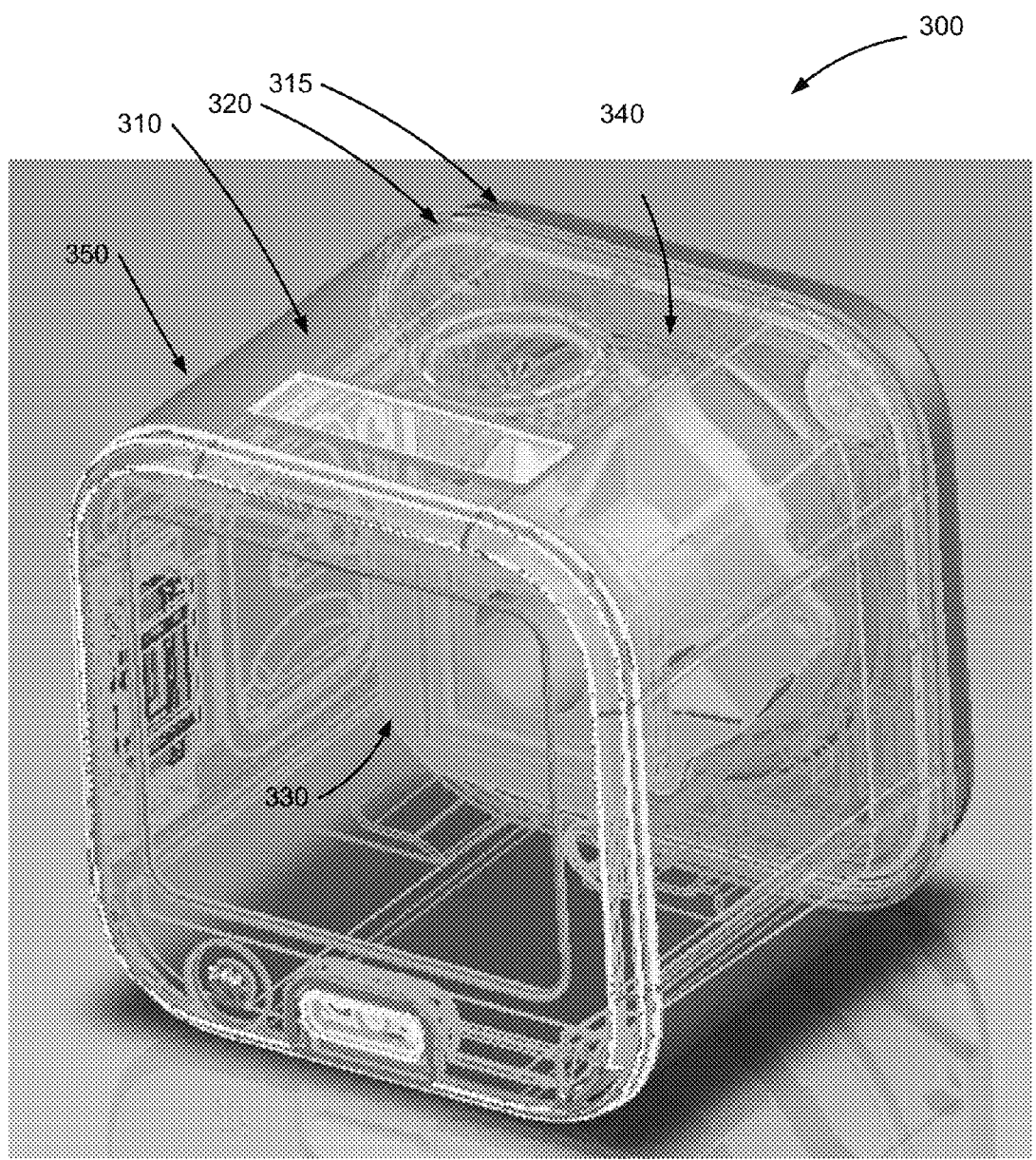
FIG. 3c illustrates a rear perspective view of a camera housing including an outer front cover, according to one embodiment.

FIG. 3c illustrates a rear perspective view of the camera housing including the outer front cover 315, providing an alternative view to the location of the lens barrel 330 within the external shell 310, and how the lens barrel 330 is coupled to the front cover 320. When the one or more openings 350 are accessed by a user, air external to the camera fills within the external shell surrounding the lens barrel 330 but cannot access the airtight cavity between the lens 335, the front cover 320, and the outer front cover 315, preventing humidity from accumulating within the airtight cavity. As stated before but better illustrated in FIG. 3c, the lens barrel 330 couples with the front cover 320 with a sealing component (not shown).

Figure 4A:
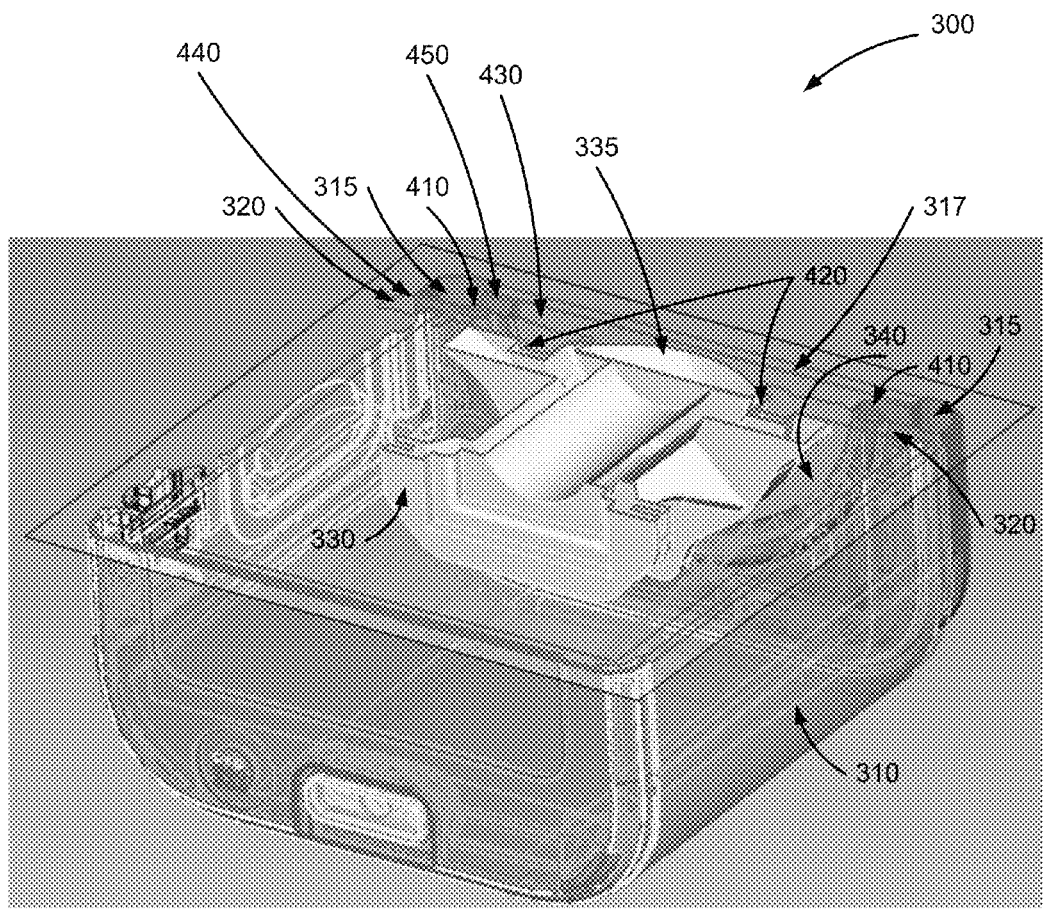
FIG. 4a illustrates a cross sectional view of a rear perspective view of a camera housing, according to one embodiment.
Figure 4B:
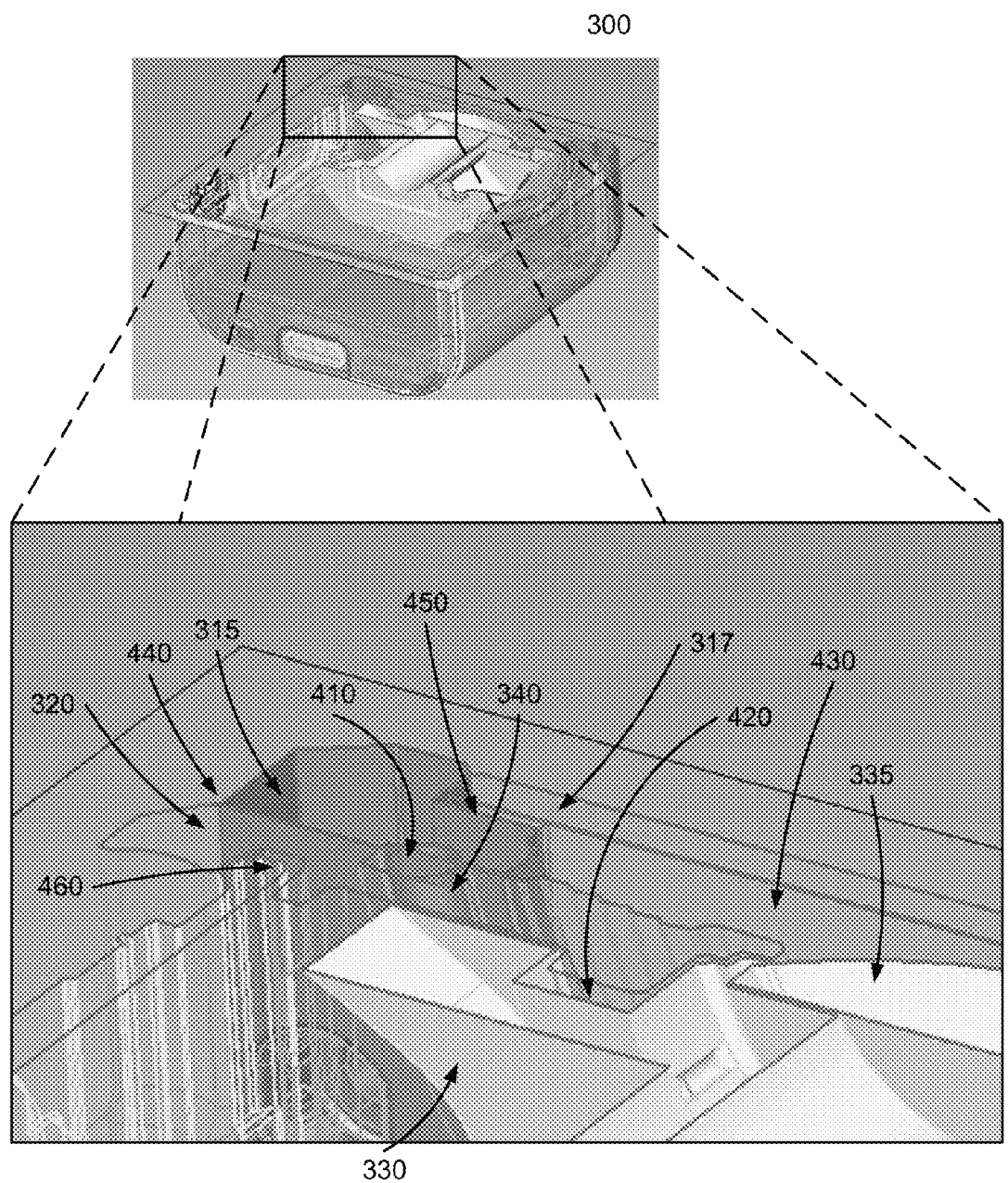
FIG. 4b illustrates a cross sectional close up view of a humidity prevention system of a camera housing, according to one embodiment.
Figure 4C:
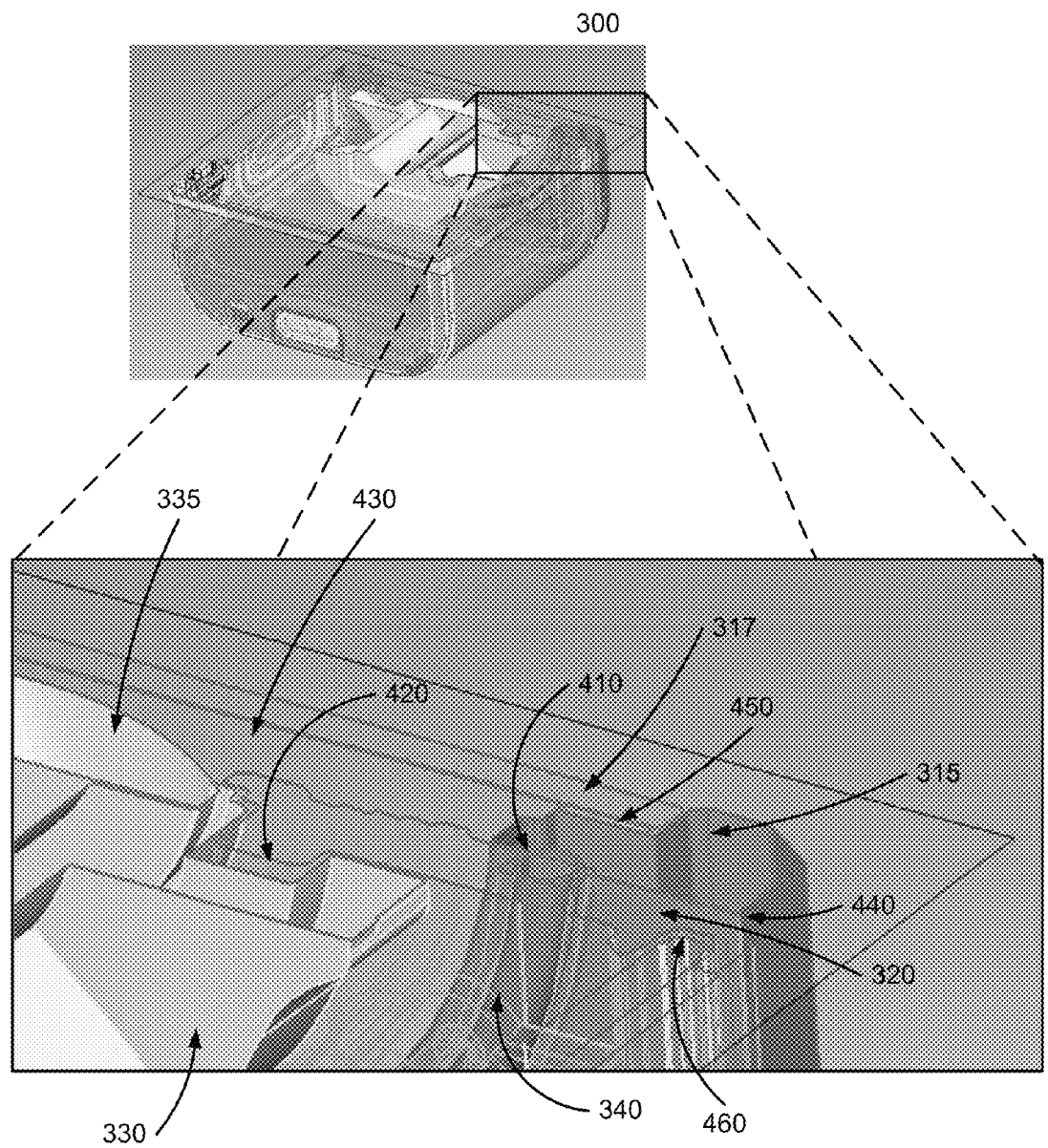
FIG. 4c illustrates an alternative cross sectional close up view of a humidity prevention system of a camera housing, according to one embodiment.

To better illustrate the humidity prevention system, cross sectional views from a rear perspective view of the camera housing are shown in FIGS. 4a, 4b, and 4c. Referring to FIG. 4a, illustrated is a cross sectional view of a camera housing showing the bottom half of the camera housing. The camera housing includes the lens barrel 330 within the external shell 310 and coupled to the lens 335 and the front cover 320. The front cover 320 is connected to the first sealing component 340 and the outer front cover 315. There is an airtight cavity 430 between the outer front cover 315 (and the viewing component 317) and the front cover 320 and the lens 335. The humidity prevention system includes various seals 410 and 420 to ensure that the airtight cavity 430 is airtight, as further shown in FIGS. 4b and 4c.

Referring now to FIG. 4b, illustrated is a cross sectional close up view of a humidity prevention system of a camera housing, according to one embodiment. The humidity prevention system includes seals 410 and 420 to ensure that the airtight cavity 430 is airtight. In various embodiments, each of the seals 410 and 420 can be an O-ring, adhesive tape, glue, screws, or any other suitable material or mechanical seal that creates an airtight seal. The seal 410 can be the first sealing component 340 and creates an airtight seal when the first sealing component 340 is compressed between the front cover 320 and the outer front cover 315. The second seal 420 creates an airtight seal between the lens barrel 330 and the front cover 320 and, in one embodiment, can be adhesive tape that is compressed when the lens barrel 330 and the front cover 320 are coupled. In another embodiment, the humidity prevention system can include a third seal 440 that further creates an airtight seal between the front cover 320 and the outer front cover 315 and can be glue or any other suitable material or mechanical seal as described previously. The humidity prevention system also includes a seal 450 between the outer front cover 315 and the viewing component 317 and can be any other suitable material or mechanical seal as described previously. In some embodiments, the seal 410 is inserted into a reciprocal cavity within the front cover 320 that is concentric around the lens 335. Likewise, in some embodiments, the seal 420 is inserted into a reciprocal cavity within a front face of the lens barrel 330 that is concentric around the lens 335. The third seal 440 can be coupled to an exterior surface of the front cover 320 and the outer front cover 315, creating an airtight seal between them.

FIG. 4c illustrates an alternative cross sectional close up view of a humidity prevention system of a camera housing, according to one embodiment. For example, the close up view of FIG. 4c illustrates the seals 410 and 420 included in the humidity prevention system to ensure that the airtight cavity 430 is airtight. As shown in FIG. 4b, the seal 410 can be the first sealing component 340 and creates an airtight seal when the first sealing component 340 is compressed between the front cover 320 and the outer front cover 315. Similarly, the second seal 420 creates an airtight seal between the lens barrel 330 and the front cover 320 and, in one embodiment, can be adhesive tape that is compressed when the lens barrel 330 and the front cover 320 are coupled. In embodiments with a third seal 440, an airtight seal is created between the front cover 320 and the outer front cover 315 through the third seal 440, which can also be glue or any other suitable material or mechanical seal as described previously. Further, the humidity prevention system can also include a fourth seal 450 between the outer front cover 315 and the viewing component 317 and can be any other suitable material or mechanical seal as also described previously.

Each of one or more of the seals 410, 420, 440, and 450 create the airtight cavity 430 between the lens 335, the outer front cover 315, and the front cover 320. Thus, in an example embodiment, the seal 410 is an O-ring that creates an airtight seal everywhere the O-ring is compressed between the front cover 320 and the outer front cover 315, the seal 420 is adhesive tape and creates an airtight seal between the lens barrel 330 and the front cover 320 all the way around the lens 335 where the lens barrel 330 and the front cover 320 meet along the seal 420, and the seal 430 is glue and creates an airtight seal between the front cover 320 and the outer front cover 315 all the way around the lens 335 where the front cover 320 and the outer front cover 315 meet along the seal 440.

The humidity prevention system can also include additional components in addition to the seals 410, 420, 440, 450, or any combination thereof. For example, the humidity prevention system can include a heat sink and, in one embodiment, the front cover 320 acts as a heat sink. Thus, heat that builds up in the airtight cavity 430 can be dissipated through the front cover 320. As another example, additional seals can be included to create more airtight seals between the components previously mentioned, further preventing humidity from building up within the space 430. One example is shown via the seal 460 in FIGS. 4b and 4c, which creates an airtight seal between the front cover 320 and the external shell 310. Therefore, an additional layer of an airtight seal further prevents humidity from building up within the external shell 310 and, consequently, from building up within the space 430.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A humidity prevention system in a camera system, the humidity prevention system comprising:
    an external shell of the camera system including a lens barrel, the lens barrel comprising a lens;
    a front cover coupled to the external shell and coupled to the lens barrel;
    an outer cover coupled to the front cover of the camera system;
    a lens window coupled to the outer cover; and
    a plurality of seals, each seal coupled to one or more of the external shell, the lens barrel, the front cover, the outer cover, and the lens window, thereby forming an airtight cavity between the external shell, the lens barrel, the front cover, the outer cover, and the lens window.

2. The humidity prevention system of claim 1, wherein each seal comprises one or more of an O-ring, an adhesive, a screw, and glue.

3. The humidity prevention system of claim 1, wherein a first seal is inserted within a reciprocal cavity within a front face of the lens barrel.

4. The humidity prevention system of claim 1, wherein a front face of the camera system is substantially square in shape.

5. The humidity prevention system of claim 4, wherein the lens window is substantially square in shape.

6. The humidity prevention system of claim 4, wherein the lens barrel is located in a center of the front face of the camera system.

7. A humidity prevention system in a camera system, the humidity prevention system comprising:
    a front face of the camera system;
    a lens barrel including a lens protruding from the front face of the camera system;
    a side wall protruding from an outside perimeter of the front face;
    a lens window coupled to the side wall; and
    a plurality of seals, each seal coupled to one or more of the front face, the lens barrel, the side wall, and the lens window, thereby forming an airtight cavity between the front face, the lens barrel, the side wall, and the lens window.

8. The humidity prevention system of claim 7, wherein each seal comprises one or more of an O-ring, an adhesive, a screw, and glue.

9. The humidity prevention system of claim 7, wherein a first seal is inserted within a reciprocal cavity within the front face or within the lens barrel.

10. The humidity prevention system of claim 7, wherein the front face of the camera system is substantially square in shape.

11. The humidity prevention system of claim 10, wherein the lens window is substantially square in shape.

12. The humidity prevention system of claim 10, wherein the lens barrel protrudes from a center of the front face of the camera system.

13. A camera system comprising:
    a lens barrel comprising a lens;
    a front face of the camera system;
    a first seal coupled to and creating an airtight seal between the lens barrel and the front face;
    an outer cover of the camera system; and a second seal coupled to and creating an airtight seal between the front face and the outer cover, thereby forming an airtight cavity between the lens barrel, the front face, and the outer cover.

14. The camera system of claim 13, wherein the first seal and the second seal each comprise one or more of an O-ring, an adhesive, a screw, and glue.

15. The camera system of claim 13, wherein the first seal is inserted within a reciprocal cavity within the front face or within the lens barrel.

16. The camera system of claim 13, wherein the front face of the camera system is substantially square in shape.

17. The camera system of claim 16, wherein a face of the outer cover is substantially square in shape.

18. The camera system of claim 16, wherein the lens barrel is located in a center of the front face of the camera system.

19. The camera system of claim 13, wherein at least a portion of the outer cover is transparent.

20. The camera system of claim 13, wherein the lens protrudes from a plane formed by the front face into the airtight cavity.

* * * * *